United States Patent

Aurich et al.

[11] 3,709,248
[45] Jan. 9, 1973

[54] MULTIPLE VALVE MODULE

[75] Inventors: Christoph W. Aurich, Clemson; John C. Bryant, Fort Mill, both of S.C.; James R. Riley, Stanley, N.C.

[73] Assignee: Gaston County Dyeing Machine Company, Stanley, N.C.

[22] Filed: Feb. 26, 1971

[21] Appl. No.: 119,172

[52] U.S. Cl. ..................137/271, 137/597, 137/608, 251/145
[51] Int. Cl. ............................................. F16k 19/00
[58] Field of Search...........137/454.2, 271, 597, 608; 251/145

[56] References Cited

UNITED STATES PATENTS

| | | |
|---|---|---|
| 2,598,961 | 6/1952 | Andrus...............................137/608 |
| 3,516,638 | 6/1970 | Piggott...........................137/608 X |
| 3,481,310 | 12/1969 | Alburger........................251/145 X |
| 3,117,587 | 1/1964 | Willinger.....................137/454.2 X |
| 1,472,265 | 10/1923 | Bell....................................137/608 |
| 2,954,028 | 9/1960 | Smith............................137/271 X |
| 3,447,755 | 6/1969 | Cartwright..................137/608 X |
| 3,566,917 | 3/1971 | White...............................137/608 |
| 3,572,366 | 3/1971 | Wiggins.......................137/608 X |

Primary Examiner—Robert G. Nilson
Attorney—Channing L. Richards, Dalbert U. Shefte, Francis M. Pinckney and Richards & Shefte

[57] ABSTRACT

A multiple valve module is provided by which a given supply fluid may be selectively distributed to any of a group of stations to be supplied, or any of a group of supply fluids may be selectively fed to a given station. The module includes a manifold having an exterior valve mounting surface through which a series of spaced flow ports open, valve means separately mounted at each of a selected plurality of the flow ports, a blocking element separately mounted at any flow port not occupied by valve means and means for connecting the manifold in a flow line or optionally in tandem with another module.

2 Claims, 6 Drawing Figures

PATENTED JAN 9 1973 3,709,248
SHEET 1 OF 2
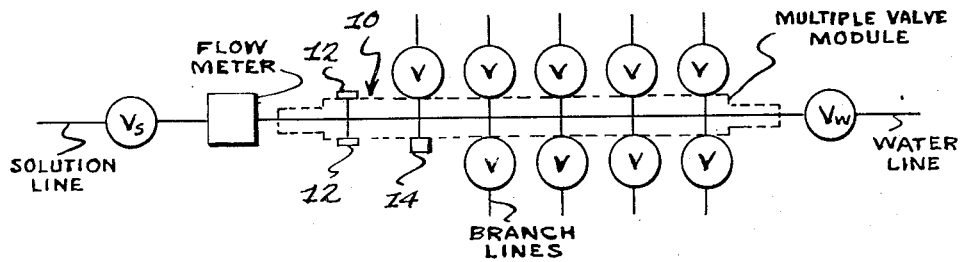
*Fig. 1*
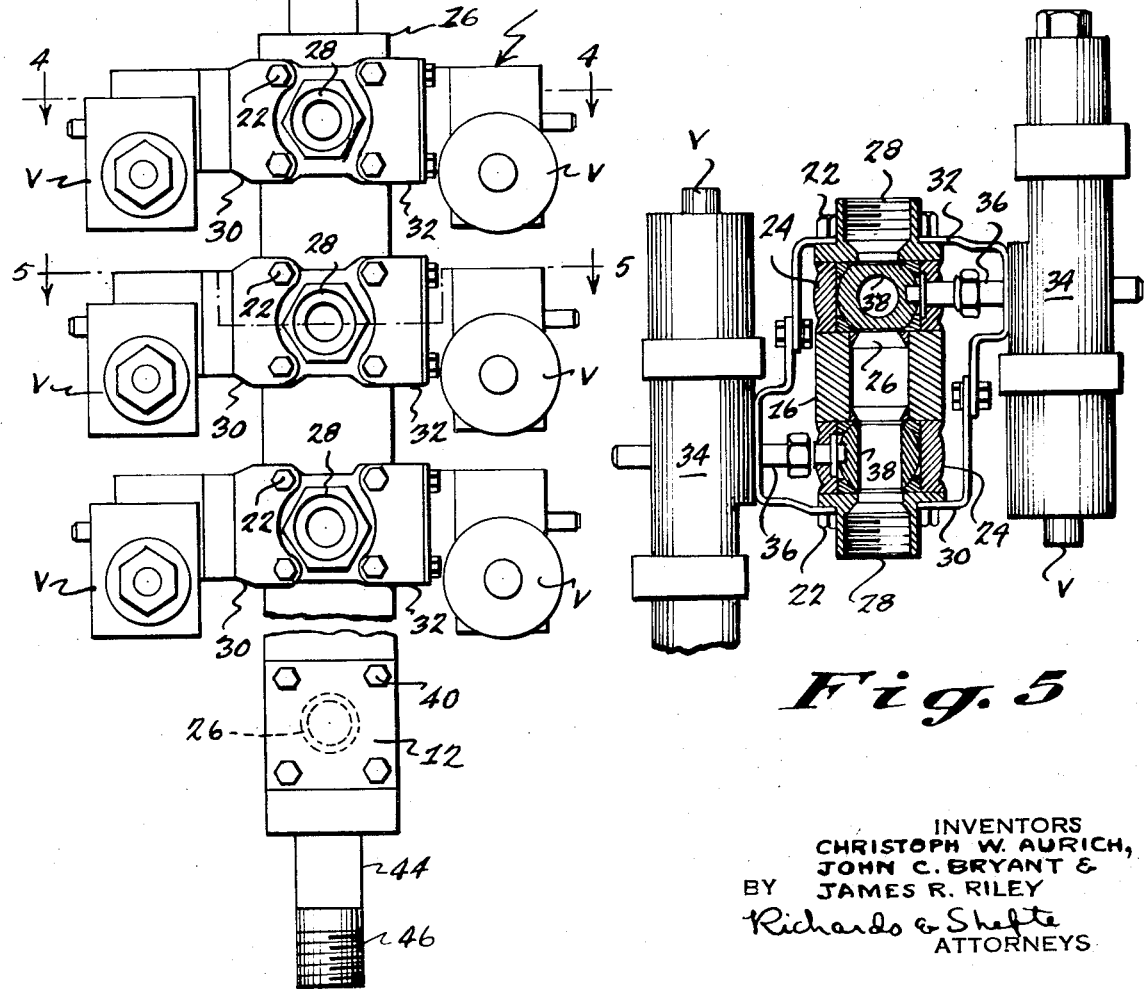
*Fig. 2*
*Fig. 5*
INVENTORS
CHRISTOPH W. AURICH,
JOHN C. BRYANT &
BY  JAMES R. RILEY
Richards & Shefte
ATTORNEYS

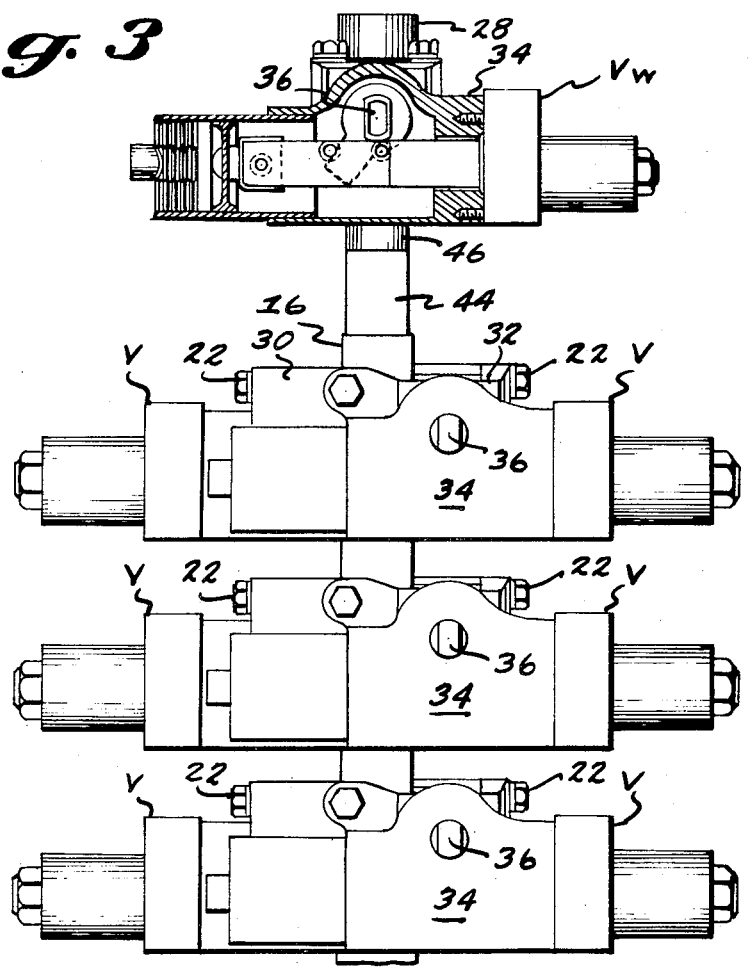
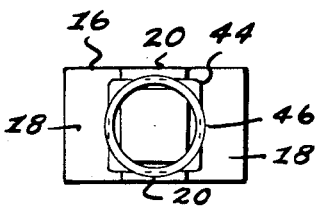
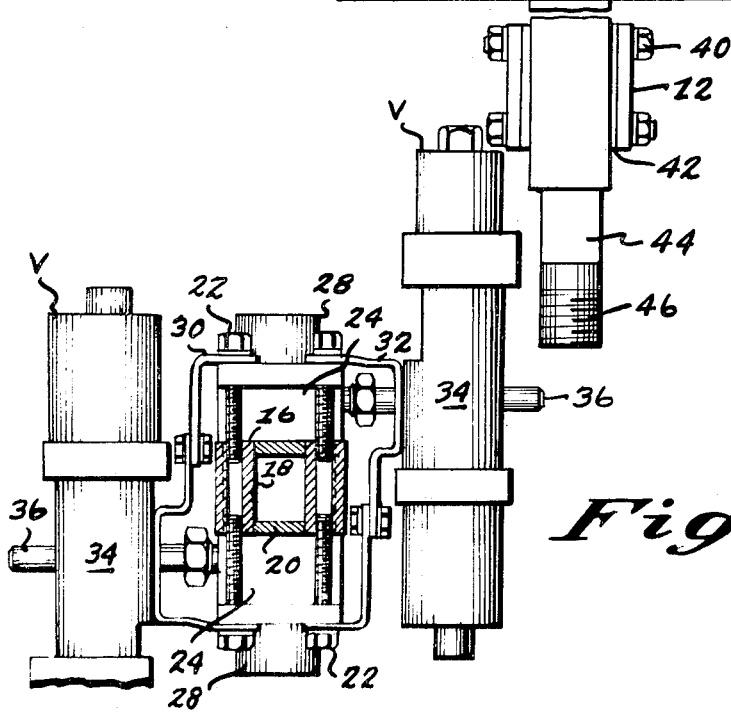

MULTIPLE VALVE MODULE

BACKGROUND OF THE INVENTION

Where selective branching of fluid flow is needed, some arrangement of directional control valving must be employed. If considerable branching selection is required and automatic control of the selection is desired, so-called turret valves have heretofore commonly been employed to provide the selective directional control. But such valves are quite complicated in form and characteristically leak to such an extent that check valves must ordinarily be employed in addition to obtain a positive shut-off. Also, such valves are not adaptable to tandem arrangement.

The present invention provides a much simplified valving arrangement of modular form that is not subject to leakage and that is adaptable with great flexibility to any selective branching requirement, while remaining readily subject to modification for enlarging or lessening the branching selection and easily accessible for maintenance.

SUMMARY OF THE INVENTION

Briefly described, the multiple valve module of the present invention comprises an elongate manifold presenting an exterior valve mounting surface and having a series of spaced flow ports opening laterally from the manifold through this surface, a valve separately mounted on the manifold at each of a selected plurality of these flow ports, a blocking element separately mounted at any flow port at which a valve is not mounted, and means at the ends of the manifold for connecting it in a flow line or optionally in tandem with another module.

By this arrangement a basic module can be formed having the number of valve positions that will serve best as a unit or in multiples to provide the range of branching selection likely to be required for a given purpose under varying conditions. If a single module is more than enough, the flow ports not needed are simply blocked off until such time as they may be needed, while if more than a single module is needed one or more additional modules can be coupled in tandem or in branching fashion so as to enlarge the branching selection to any reasonable extent. A practical embodiment is illustrated and described by the drawings indicated below and the specification that follows.

DESCRIPTION OF THE DRAWINGS

FIG. 1 is a diagrammatic illustration of a representative selective branching arrangement incorporating a multiple valve module according to the present invention;

FIG. 2 is a plan view of an actual embodiment of the module;

FIG. 3 is a side view corresponding to FIG. 2;

FIG. 4 is a section detail taken substantially at the line 4—4 in FIG. 2;

FIG. 5 is a section detail taken substantially at the line 5—5 in FIG. 2; and

FIG. 6 is an end view of the manifold employed in forming the module.

DESCRIPTION OF THE PREFERRED EMBODIMENT

The FIG. 1 illustration diagrams a representative installation of a multiple valve module embodying the present invention. The module is indicated in broken outline at 10 as having twelve valve positions, nine of which are occupied by branch line valves V, while the remaining three are blocked-off as at 12 and 14. At one end the module 10 is further indicated as being connected through a valve $V_w$ to a water line and at the other through a flow meter and valve $V_s$ to a solution line.

Such an arrangement is suitable for feeding a chemical solution selectively to a group of nine dyeing machines in measured amounts, the feeding operation being conducted by opening a selected branch line valve V together with the solution line valve $V_s$ and allowing the chemical solution to feed until the flow meter indicates the desired amount has passed into the manifold 10, and then closing the valve $V_s$ and opening the water line valve $V_w$ to flush the manifold clear of solution followed by closing valve $V_w$ and the open valve V to return all valves to their normally closed condition.

A similar arrangement can be employed in reverse so that the branch line valves V are employed to feed selected chemical solutions through the solution line to a single dyeing machine. As the branch line valves V are separately positioned, automatic control of valve selection and sequence can be readily provided, more than one valve V can be selected for concurrent operation whenever desired for mixing purposes, and as many modules 10 can be employed in tandem or branching fashion as practical considerations allow.

The remaining FIGS. 2-6 of the drawings detail the structural arrangement of an actual embodiment of the multiple valve module 10 indicated in FIG. 1. In FIGS. 2 and 3 the module 10 is shown in plan and side elevation, respectively, as comprising a manifold 16 on which the previously mentioned branch line valves V are separately mounted in pairs at spaced positions lengthwise of the manifold. FIGS. 4 and 5 show the manifold 16 as being formed compositely of side sections 18 between which top and bottom sections 20 are joined, as by welding, to provide an interior flow channel of square cross section within a rectangular body. Greater thickness of the side sections 18 makes the body of manifold 16 sufficiently rectangular to accommodate threaded bores for receiving mounting bolts 22 by which the casings 24 of valves V are held in place at circular flow ports 26 that are formed in the top and bottom manifold sections 20 to define a spaced series of valve positions. Reference to the top and bottom sections 20 should be recognized as identifying only their illustrated position in the drawings and not in any way indicating that the modules 10 must be positioned in any particular way for effective use and operation. Also, it should be noted that the body of manifold 16 can be comparably formed in other ways, as by employing an annular section and flatting the same to provide for valve mounting.

The valves V are preferably electro-pneumatically operated ball valves of standard commercial form arranged as illustrated in FIG. 5 with the valve casings 24 mounted directly on the manifold 16 together with a flange fitting 28 by which the branch lines (not shown) may be connected therewith. For such direct mounting, the manifold surfaces formed by the end faces of the side sections 18 and the exposed faces of the top and bottom sections 20 are shaped to correspond with the opposing surface of the valve casings 24. The simplest arrangement for this purpose is a flat manifold valve mounting surface and a corresponding flat valve casing surface for mounting, as shown in FIG. 5, although any other combination of corresponding or complementary surfaces might be used if desired. Ball valves V are preferred not only because they can be employed readily in standard form as components of the module 10, but also because they afford a positive shut-off and accordingly eliminate any need for auxiliary check valves in the lines they control.

The mounting bolts 22 that hold the flange fittings 28 and the valve casings 24 in place on manifold 16 are also employed to secure pairs of brackets 30 and 32 provided to carry valve operating mechanisms 34 adjacently with valve stems 36 extending therefrom through the casings 24 to engage the enclosed valve balls 38. Because the illustrated manifold 16 is formed with top and bottom valve mounting surfaces and with flow ports 26 that are aligned in pairs at these surfaces, the paired valves V are most conveniently mounted in reversed relation at these flow ports, but it will be apparent that this reversed mounting relation is not necessary, that the manifold 16 might be formed otherwise to present only one or more than two valve mounting surface or surfaces, and that the valve mounting surface or surfaces need not be continuous or rectilinear if there is any reason to form them otherwise.

In the illustrated embodiment, which provides a flow channel of square cross section within the manifold 16 that is of greater width than the diameter of the bore through the valve balls 38, it is advantageous to form the circular flow ports 26 with a taper from the flow channel width to the ball bore diameter so as to avoid any pocket formations within the manifold 16 that are likely to make it difficult to flush cleanly. Such avoidance of pockets within the manifold 16 is desirable in any event, but this may also be done by minimizing the manifold wall thickness at the valve mounting surfaces, and it should be noted that the cross sectional shape of the manifold flow channel is immaterial so long as it has an area within the range of 0.25 to 25.0 times that of the valve ball bore so that flow therethrough can be maintained at reasonable rates and pressure and the size of the manifold remains practical.

The previously mentioned blocking elements 12 employed at unoccupied flow ports 26 are illustrated in FIGS. 2 and 3 as being formed by plate members that are secured in place by suitable bolts 40, in place of the valve mounting bolts 22, and are provided with suitable gasketing as at 42. If an unoccupied flow port 26 occurs opposite one at which a valve V is to be positioned, as diagramed at 14 in FIG. 1, a spacer block (not shown) is added in place of the absent valve casing 24 and mounting bolts 22 are used so that the oppositely situated valve V can be mounted in the usual manner.

At its ends, each manifold 16 is fitted so that it may be connected in a flow line or in tandem with another manifold, or may be capped at one end if a branching arrangement makes this necessary. For this purpose a transition structure is provided from the cross section of the manifold flow channel to that of a pipe fitting. For the square cross section of the manifold flow channel in the illustrated embodiment, FIG. 6 shows the transition structure as including a square tubing section 44 of the same cross sectional size attached at each end of manifold 16 with a round pipe-threaded section 46 attached at the projecting end thereof in a corresponding size to provide for connection at a suitable spacing from the manifold ends. If a standard pipe can be obtained in the size required, it may be used to form the entire end fitting as a round section, but if the round section 46 must be made specially it will usually be best to employ the FIG. 6 arrangement because square tubing of the proper stock size is apt to be available.

FIGS. 2 and 3 show a representative connection of one manifold end fitting to a water line valve Vw which is of the ball-type and corresponds exactly with the manifold valves V except that it is provided with flange fittings 28 at both sides of the valve casing 24 and with a different form of mounting bracket 48 for carrying the operating mechanism 34 from which the valve stem 36 extends to engage the valve ball 38 within the casing 24. As shown, the round section 46 of one of the manifold end fittings is installed in one of the flange fittings 28 of valve Vw while the other flange fitting 28 is available for connection of a water line (not shown) thereat. The other manifold end fitting may be coupled in tandem with another module 10 or in any conventional fashion to another flow line such as the solution line indicated in FIG. 1. Additionally, a module 10 can be connected in branching fashion in place of any one of the valves V, although it may be desirable or necessary in such a case, or even in tandem arrangements, to employ modules 10 sized for different flow throughputs or capacities in order to balance the system properly.

In making single or tandem or branching connections of modules 10 for practical use, it makes no difference whether the module or modules 10 are disposed horizontally, vertically or inclined at any degree. Also, the multiple valve modules 10 of the present invention operate equally well in pressurized and atmospheric systems. Because there are no moving parts within the manifold 16, and because the manifold valves V are separately mounted and readily accessible, installation and maintenance of the modules 10 are exceptionally simple in relation to other selective branching arrangements heretofore employed.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

We claim:

1. A multiple valve module comprising an elongate unitary manifold having a series of spaced flow ports opening laterally therefrom, shut-off valve means separately mounted exteriorly on said manifold at each of a selected plurality of said ports and selectively operable for opening and closing flow lines thereat, said valve means including a housing enclosing a valve member, a blocking element separately mounted exteriorly on said manifold at any of said ports at which valve means is not mounted, and means at the ends of said manifold for connecting the same in a flow line or optionally in tandem with another module, the mounting of said valve means and blocking elements being effected at exterior surface portions of said manifold surrounding each of said laterally opening flow ports and said valve means and blocking elements being mounted with corresponding surface portions thereof disposed in face-to-face sealing relation at said manifold surface portions and with said valve housing and said blocking elements located entirely outside of said manifold.

2. A multiple valve module as defined in claim 1 and further characterized in that at least one of said separately mounted valve means is another valve module.

* * * * *